United States Patent [19]
Fischer et al.

[11] 4,436,385
[45] Mar. 13, 1984

[54] SPECIMEN HOLDER FOR INVERTED MICROSCOPES

[75] Inventors: Horst Fischer; Friedrich K. Möllring, both of Aalen, Fed. Rep. of Germany

[73] Assignee: Carl-Zeiss-Stiftung, Heidenheim, Fed. Rep. of Germany

[21] Appl. No.: 287,379

[22] Filed: Jul. 24, 1981

[30] Foreign Application Priority Data

Jul. 25, 1980 [DE] Fed. Rep. of Germany ....... 3028154

[51] Int. Cl.³ .......................... G02B 21/26; B25B 5/02; B25B 5/16
[52] U.S. Cl. .................................... 350/529; 269/902; 269/257
[58] Field of Search .............................. 350/529–533; 269/902, 257, 272

[56] References Cited

U.S. PATENT DOCUMENTS

| | | | |
|---|---|---|---|
| 598,130 | 2/1898 | Wright | 269/272 |
| 1,651,263 | 11/1927 | Fetters | 269/272 |
| 1,672,808 | 6/1928 | Hansel | 269/902 |
| 1,912,313 | 5/1933 | Schwab | 269/272 |
| 2,429,801 | 10/1947 | Butler | 269/257 |
| 2,734,410 | 2/1956 | Gipperich | 269/252 |
| 3,991,990 | 11/1976 | Shemtov | 269/257 |
| 4,339,116 | 7/1982 | Benz et al. | 269/902 |

Primary Examiner—Jon W. Henry
Attorney, Agent, or Firm—Hopgood, Calimafde, Kalil, Blaustein & Judlowe

[57] ABSTRACT

The invention contemplates, for use with an inverted microscope, a specimen holder having a relatively wide range of capability for replaceably accepting and holding any one of a variety of sizes and shapes of specimens. Aside from the specific capability of accepting standard-size microscope-specimen slides, the holder can equally well and positively mount circular specimen supports of various diameters, such as Petri dishes or Erlenmeyer flasks. In one disclosed form, the release and clamp operation of the holder is a simple one-handed operation, leaving the other hand of the operator free for other purposes.

8 Claims, 3 Drawing Figures

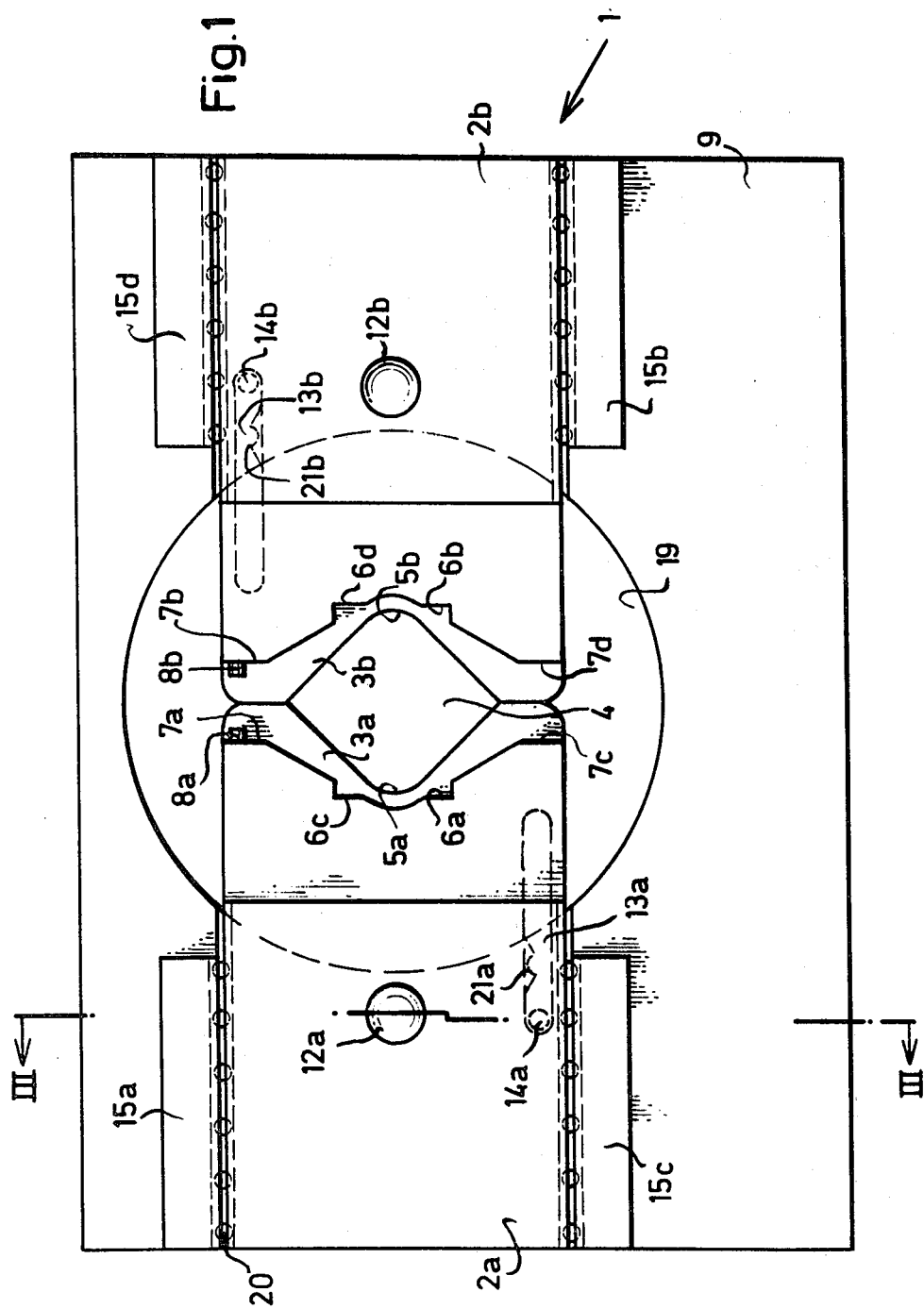

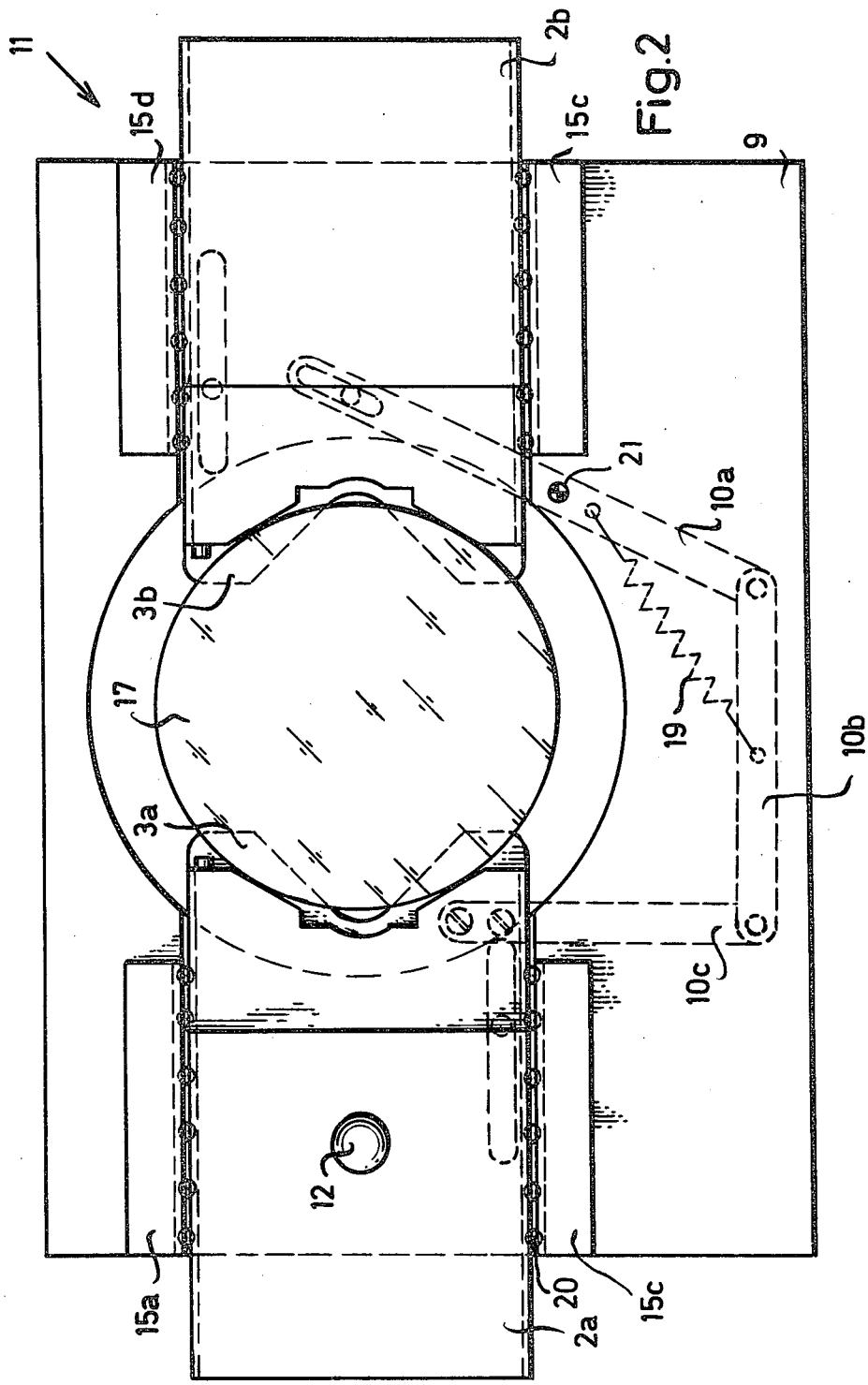

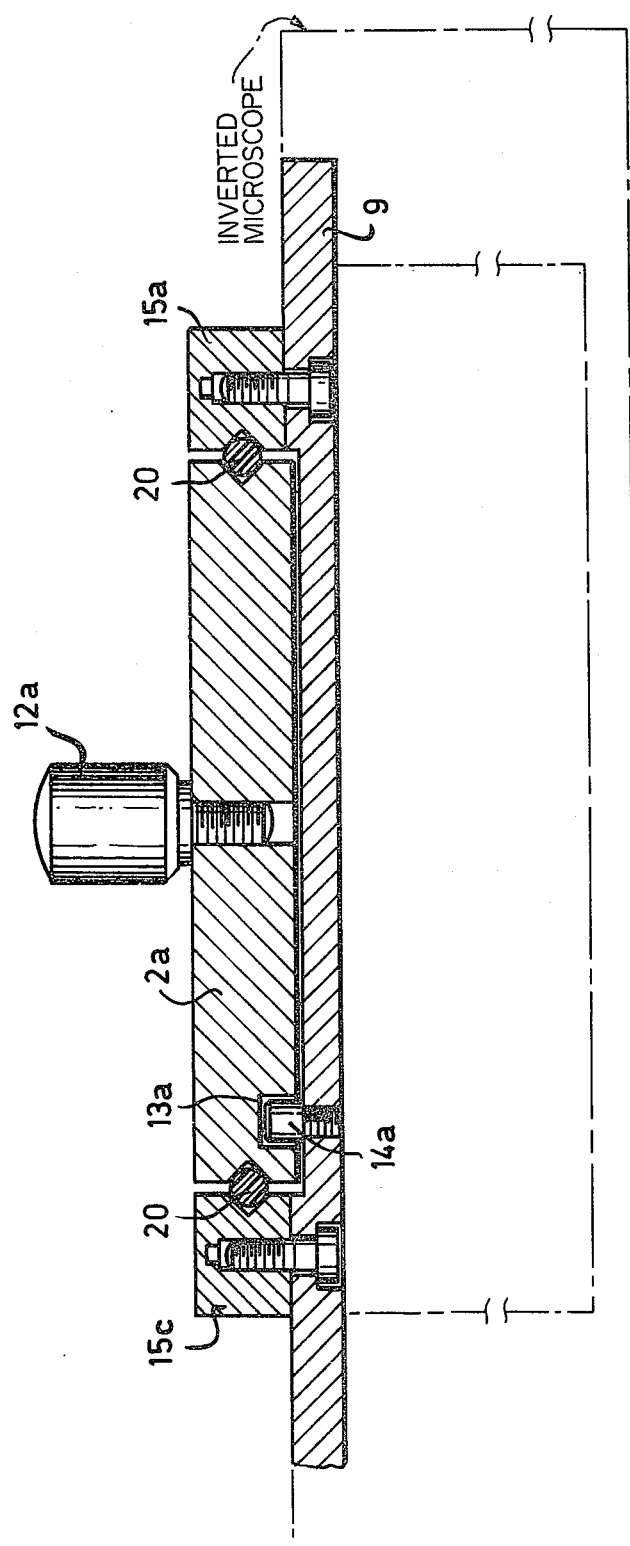

SPECIMEN HOLDER FOR INVERTED MICROSCOPES

BACKGROUND OF THE INVENTION

The present invention relates to a specimen holder for inverted microscopes, i.e., microscopes in which the objects are viewed from below.

These inverted microscopes, which were originally constructed for the examination of specimens which settle out on the bottom of vessels, such as chemical reaction products, micro-organisms, tissue cultures, etc., are finding increasing use as universal microscopes since even upon the observation of "normal" specimens, i.e., specimens which can be examined with erect microscopes, no disadvantages are present; on the contrary, the generally greater stability of the inverted microscope frequently has an advantageous effect.

Upon examination by an inverted microscope, such objects of the most different dimensions are in the simplest case merely placed on the stage, which is provided with an opening in the region of the field of view. Specimens which are placed in this way on the stage may, however, slide out of position, so that, in most cases, it is necessary to fix the specimen on the surface of the stage.

From West German Gebrauchsmuster No. 7,232,969, it is known to use different replaceable special specimen holders adapted to the dimensions of the objects to be examined, in order to hold different objects. The disadvantage of such a system resides not only in the additional expense for a series of different specimen holders but, when operating with different objects, the user is furthermore forced to continuously replace the specimen holders; this practice is not only inconvenient, but it becomes more time-consuming the greater the number of holders in the system.

BRIEF STATEMENT OF THE INVENTION

The object of the present invention is to provide a specimen holder for inverted microscopes which can receive the largest possible number of objects of different dimensions and yet be simple to operate.

The invention achieves this object by providing a specimen holder which consists essentially of two plates or jaws which are mounted for displacement with respect to each other, the facing sides of which being provided with a step, each consisting of a lower object-supporting part with indentations and an upper part set back from said lower part, also bearing indentations, said indentations of the upper parts of both said plates forming specimen-locating openings the dimensions of which can be varied by displacement of the plates to adapt to the size of the particular specimen.

The advantage of the invention is that objects of different size or shape can be fixed in the holder and, if desired, clamped by the upper part of the step, using a single manipulator, without any substantial shadowing or masking of their bottom, i.e., of the object field, by the lower or object-supporting part of the step.

The indentations are advisedly of V-shape, whereby one obtains a particularly reliable holding of cylindrical vessels of strongly different diameters, such as Petri dishes and Erlenmeyer flasks.

In order to receive standard rectangular specimen slides, the upper receding portion of the step on each plate is provided with a pair of notches so that the object slide can be inserted into the depression which corresponds to its dimensions after the plates have been moved apart. In the case of the frequent use of standard specimen slides, it is furthermore advantageous to provide the corresponding position of extension of the plates with a detent which permits rapid adjustment into this position and prevents too easy an opening of the jaws formed by the plates, thus precluding an inadvertent dropping of the specimen slide.

In order to receive larger tissue-culture bottles of rectangular cross section or so-called Terasaki chambers, the upper recessed parts of the opposed steps can be advantageously formed to extend parallel to each other in the outer-edge region on both plates. To provide security against lateral displacement along the parallel formations, a lateral stop is then provided, for instance in the form of two opposed threaded pins which can be easily removed, should they interfere with the holding of very large objects.

In order to make it difficult for the plates to be inadvertently displaced, as by unintended jolts and regardless of position, the plates are advisedly clamped against each other by spring force, thereby clamping the object in question in its receiver. Rapid replacement of specimens is facilitated if the two plates are so coupled with each other for movement that, upon displacement of one plate, the second moves in the opposite direction. The user can then operate the object holder with one hand and, with his other hand, place the object on the step which he has retractably set to accord with the dimensions of the object.

DETAILED DESCRIPTION

The invention will be described in detail with reference to the accompanying drawings, in which:

FIG. 1 is a top view of a specimen holder of the invention;

FIG. 2 is a similar view to show a modified version of the specimen holder of FIG. 1; and FIG. 3 is a section taken along the line III—III of FIG. 1, with schematic indication of the inverted microscope context of use of the specimen holder.

The specimen holder 1 shown in FIGS. 1 and 3 consists essentially of a base plate 9 having a central hole 19 around which there are arranged pairs of guide members or ledges 15a, 15c and 15b, 15d, respectively, which serve for longitudinal guidance of plates 2a and 2b, respectively. The range of movement of these plates is limited by projections 14a and 14b in base plate 9 and coacting longitudinal grooves 13a and 13b in plates 2a and 2b, respectively.

Opposite confronting edges of the plates have V-shaped indentations 5a and 5b which, when the plates are pushed together, form a diagonally divided rectangular opening 4. Each of the abutting ends of the plates 2a and 2b is provided with a step (3a and 3b, respectively) on which the specimens are placed and supported. Upper edges of each step 3a and 3b are set back from the indentation edges 5a and 5b; at their laterally outer regions 7 (marked in FIG. 1 as a first opposed pair 7a–7b and as a second opposed pair 7c–7d) these edges of plates 2a and 2b extend parallel to each other, and each of the edges 7a and 7b has a stop in the form of a threaded pin (8a and 8b, respectively), for the case of rectangular specimens held by the edges 7. In the central region (i.e., between edges 7a and 7c, and between edges 7b and 7d), the upper edges of steps 3a and 3b are indented and have notches (6a–6c and 6b–6d, respectively) which, upon retracting plates 2a and 2b into the detent position formed by spring wires 21a and 21b, respectively, define the corners of a rectangle to receive and locate the corners of standard specimen slides.

With the ranges permitted by grooves 13a and 13b, plates 2a and 2b can be manipulated by means of knobs 12a and 12b. As shown in FIG. 3, plates 2a and 2b are designed to move via balls 20 in opposed V-shaped grooves in the guide ledges 15 and in plates 2a and 2b.

In a modified embodiment, namely, the specimen holder 11 shown in FIG. 2, the plates 2a and 2b also move via balls 20 in the V-grooves of guide ledges 15 and in the adjacent guided edges of plates 2a and 2b. Plate 2b is coupled for substantially equal and for opposite movement with respect to plate 2a; specifically, this coupling involves a lever 10a centrally pivoted at 21 to base plate 9, one of the ends of lever 10a having pin-and-slot connection to plate 2b, and the other end of lever 10a having a link 10b connection to an offset arm 10c forming a rigid part of plate 2a. A spring 19 between lever 10a and link 10b urges the two plates 2a and 2b toward each other.

The base plate 17 of a Petri dish is shown supported on the step surfaces 3a and 3b and is clamped by and between the upper confronting edge parts of the steps, which act as clamping jaws. For a scanning observation of the specimen, it will be understood that one displaces the entire specimen holder which, for instance, may be mounted on the cross slide of a two-coordinate stage; alternatively, the base plate 9 may be the cross-slide component of such a two-coordinate stage.

What is claimed is:

1. A specimen holder mounted on the stage of an inverted microscope for receiving specimens of different dimensions, characterized by the fact that the specimen holder (1) consists essentially of two plates (2a, 2b) which are horizontally mounted for displacement with respect to each other, the two opposite sides of said plates having indentations (5a, 5b) provided with steps (3a, 3b) for disposing the specimens thereon, said indentations supplementing each other to form an opening (4) the dimensions of which can be varied by displacing the plates (2a, 2b).

2. A specimen holder according to claim 1, characterized by the fact that the indentations (5) are of substantially V shape.

3. A specimen holder according to claim 1, characterized by the fact that each of the receding portions of the steps (3) has a pair of notches (6a, 6c; 6b, 6d) to receive standard specimen slides.

4. A specimen holder according to claim 1, characterized by the fact that the receding portions of the steps (3a, 3b) extend parallel to each other in the end region of the two plates (2a, 2b) in order to receive rectangular specimens and that at least one lateral stop (8a, 8b) is provided.

5. A specimen holder according to claim 1, characterized by the fact that both plates (2) are freely movable with respect to each other and are in frictional engagement with their guides (9, 15).

6. A specimen holder according to claim 1, characterized by a coupling (10) between the plates (2) which coupling, upon the displacement of one plate (2a), moves the second plate (2b) in opposite direction.

7. A specimen holder according to claim 1, characterized by spring means (19) which urge the two plates (2) towards each other.

8. A specimen holder mounted on the stage of an inverted microscope, comprising a horizontal base member with a generally central opening through which viewing access is available, guide means on said base member on a longitudinal axis traversing and on both sides of said opening, first and second slide plates guided by said guide means on the respective sides of said opening, the confronting edges of said plates being characterized by like central indentations, whereby even for a mutually abutting position of said plates said indentations may permit viewing access via the included open area defined by said indentations, and whereby a given specimen may be supported on specimen-support surfaces of both plates to span the effective viewing opening, said plates being further characterized by specimen-engageable means upstanding from said support surfaces at set-back offset from said confronting edges, whereby said upstanding specimen-engageable means may stabilize specimen positioning over the viewing opening when abutted to opposite sides of the specimen.

* * * * *